United States Patent [19]

Nakamura et al.

[11] Patent Number: 5,787,434
[45] Date of Patent: Jul. 28, 1998

[54] FILE PROCESSING APPARATUS, FILE PROCESSING METHOD AND A COMPUTER READABLE MEMORY MEDIA

[75] Inventors: Yoshiharu Nakamura, Ome; Katuzi Takano, Musashimurayama, both of Japan

[73] Assignee: Casio Computer Co., Ltd., Tokyo, Japan

[21] Appl. No.: 604,166

[22] Filed: Feb. 21, 1996

[30] Foreign Application Priority Data

Feb. 24, 1995 [JP] Japan .................. 7-060009
Apr. 10, 1995 [JP] Japan .................. 7-107785

[51] Int. Cl.⁶ ............................................. G06F 17/30
[52] U.S. Cl. .................. 707/102; 707/509; 705/4; 345/339; 345/348; 345/352
[58] Field of Search ................... 395/613, 326; 707/102, 101, 509; 705/4; 345/348, 339, 352

[56] References Cited

U.S. PATENT DOCUMENTS 5,546,526  8/1996  Li et al. ........................ 395/348
5,615,367  3/1997  Bennett et al. ................. 395/613

Primary Examiner—Thomas G. Black
Assistant Examiner—Hosain T. Alam
Attorney, Agent, or Firm—Frishauf, Holtz, Goodman, Langer & Chick

[57] ABSTRACT

A file processing apparatus stores document-definition documents for defining documents, which document-definition documents include document-definition information such as document format information and data-creating condition information for creating document data. The apparatus has record files including files that store data to be used for creating document data. Document data for a first document is displayed on a display unit, and an operator selects or designates one of plural data in the document data displayed on the display unit, and the designated data is temporarily stored. When the operator designates a second document to be created, the second document is created based on the document-definition information included in the document-definition document corresponding to the second document, data stored in the file of the record files, and the designated data temporarily stored.

7 Claims, 13 Drawing Sheets

FIG.7A

| DOCUMENT TITLE | DOCUMENT-DEFINITION DOCUMENT 3A | |
|---|---|---|
| | OBJECT FILE | F32 |
| | RETRIEVING CONDITIONS | " " |
| | (DOCUMENT FORMAT) | |

| DOCUMENT TITLE | DOCUMENT-DEFINITION DOCUMENT 3D | |
|---|---|---|
| | OBJECT FILE | F35 |
| | RETRIEVING CONDITIONS | " " |
| | (DOCUMENT FORMAT) | |

~38D

SPECIFICATION FILE 39A

SFX-View : RESULTS □ · HELP

FILE  FORMAT  FONT  OPTION  PREFERENCES

A1:

| | A | B | C | D | E |
|---|---|---|---|---|---|
| | DEPARTMENTS | POSITIONS | NO. | NAMES | PRONUN-CIATION |
| 1 | DIRECTOR | DIRECTOR | 0001 | ITOH | ○○ |
| 2 | | | 0002 | OOKA | ○○ |
| 3 | PERSONNEL DIVISION | DIVISION MGR. | 0004 | YAMAKAWA | ○○ |
| 4 | GENERAL DEPT. | GENERAL MGR. | 0028 | ONO | ○○ |
| 5 | | SECTION MGR. | 0042 | MITA | ○○ |
| 6 | | | 0067 | HAYAKAWA | ○○ |
| 7 | EMPLOYMENT DEPT. | GENERAL MGR. | 0038 | HAYANO | ○○ |
| 8 | | SECTION MGR. | 0052 | ISHIKAWA | ○○ |
| 9 | | | 0077 | AKIBA | ○○ |
| 10 | GENERAL AFFAIRS DIVISION | DIVISION MGR. | 0010 | KOBAYASHI | ○○○ |
| 11 | GENERAL DEPT. | GENERAL MGR. | 0022 | KAWABE | ○○ |
| 12 | | SECTION MGR. | 0046 | AIDA | ○○ |
| 13 | | | 0052 | TAKASHIMA | ○○ |
| 14 | | | 0071 | NEMOTO | ○○ |

| SALES | COSTS | AWARDING | | 4 BITS | R JAPANESE |

FIG.9

DOCUMENT 3A

| COORDINATES | ICONS TITLES | RELATED DOCUMENT TITLES |
|---|---|---|
| (20,400) | aicon - a | 3B |
| (120,400) | aicon - b | 3D |
| (220,400) | aicon - c | 3H |
| | | |
| | | |

| | | | | | |
|---|---|---|---|---|---|
| 6 | | | 0067 | HAYAKAWA | ○○ ○○ |
| 7 | EMPLOYMENT DEPT. | GENERAL MGR. | 0038 | HAYANO | ○○ ○○ |
| 8 | | SECTION MGR. | 0052 | ISHIKAWA | ○○ ○○ |

FIG.12B

SALES 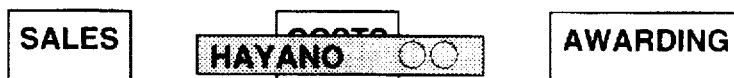 AWARDING

FIG.12C

SFX-View : RESULTS
FILE FORMAT FONT OPTION PREFERENCES    HELP
A1 :

| | A | B | C | D | E |
|---|---|---|---|---|---|
| | DEPARTMENTS | POSITIONS | NO. | NAMES | PRONUN-CIATION |
| 1 | DIRECTOR | DIRECTOR | 0001 | ITOH | |
| 2 | | | 0002 | OOKA | |
| 3 | PERSONNEL DIVISION | DIVISION MGR. | 0004 | YAMAKAWA | |
| 4 | GENERAL DEPT. | GENERAL MGR. | 0028 | ONO | |
| 5 | | SECTION MGR. | 0042 | MITA | |
| 6 | | | 0067 | HAYAKAWA | |
| 7 | EMPLOYMENT DEPT. | GENERAL MGR. | 0038 | HAYANO | |
| 8 | | SECTION MGR. | 0052 | ISHIKAWA | |
| 9 | | | | | |
| 10 | GENERAL AFFIRS DIV | | | | |
| 11 | GENERAL DEPT. | | | | |

SFX-View : RESULTS
FILE FORMAT FONT OPTION PREFERENCES    HELP
A1 :

| | A | B | C | D | E |
|---|---|---|---|---|---|
| | TREATED | NOTES | DISTANCE | AMOUNTS | |
| 1 | JAN.12,'94 | RETURN | LESS THAN 75K | 2,560 | |
| 2 | SEPT.9,'94 | RETURN | LESS THAN 75K | 6,270 | |
| 3 | JAN.1,'95 | USUAL | | 10,520 | |
| 4 | JAN.25,'95 | RETURN | LESS THAN 75K | 1,110 | |

4 BITS | R JAPANESE

5,787,434

FILE PROCESSING APPARATUS, FILE PROCESSING METHOD AND A COMPUTER READABLE MEMORY MEDIA

BACKGROUND OF THE INVENTION

1. Field of the Invention

The present invention relates to a file processing apparatus and a file processing method which perform processes of creating document data and text data and processes of reading out document data and text data from files, and further relates to a computer readable memory medium, which allows the computer to execute the processes.

2. Description of the Related Art

Document processing apparatus are well known, which are comprised of an office computer and/or a personal computer to process text data and document data.

In these document processing apparatus, to create a document, for example, a "table of sales results for each salesman", a user selects the specification of the document and raises a document creating tool. When definitions including an object file and data retrieving conditions are entered in a definition indication as shown in FIG. 13A, a processing unit of the document processing apparatus retrieves record data from record files in accordance with the entered definitions to create the "table of sales results for each salesman". When the user creates another document based on the created document, the user is required to raise the document creating tool again to create the another document, and selects data appearing on the created document and enters the selected data to certain locations of the definition indication.

More specifically, assuming that, upon reviewing the created document, i.e., the "table of sales results for each salesman", the user creates another document, "table of sales results/area" for a salesman, INOUE, shown in FIG. 13A, the user selects the specification of the "table of sales results for each salesman" and raises the document creating tool, as shown in FIG. 13B. Then, the user designates "INOUE" as the data retrieving conditions, whereby a "monthly sales" table shown in FIG. 13B is created.

As described above, when a document is created based on a previously created document, the user has to understand the relationship between the documents and execute the document creating tool. Therefore, the user has to bear a hard burden of executing troublesome operations.

SUMMARY OF THE INVENTION

The present invention has been made to overcome the above mentioned inconvenience, and has an object to provide a file processing apparatus which is capable of creating document data to be used to create a second document file from a first or original document file.

According one aspect of the present invention, there is provided a file processing apparatus having a display screen with a cursor displayed thereon, and for retrieving record data of a necessary record from plural files, which apparatus comprises:

first display control means for displaying on the display screen plural record data stored in a first file among the plural files;

data designating means for designating a display position of desired data among each of the plural record data displayed on the display screen with the cursor;

file selecting means for selecting a second file different from the first file from among the plural files;

data retrieving means, responsive to the file selecting means selecting the second file, for retrieving from the second file selected by said file selecting means record data including the desired data designated by said data designating means, using the desired data as a keyword; and second display control means for displaying on the display screen the record data retrieved by said data retrieving means.

With the file processing apparatus with the above structure, a user can use the designated data in the first document file when retrieving data from the second document file. To retrieve data from the second document file, the user is not required to enter necessary data again. Therefore, data can be easily retrieved from the second document file and outputted without a troublesome operation.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIGS. 7(A) and 7(B) are views showing contents of document-definition documents 38A and 38D;

FIG. 9 is a view showing an indication displayed on a display screen when a "list of staves" is selected;

FIG. 10 is a view showing an example of an icon/document table 40;

FIGS. 12(A) and 12(B) are views showing transitive indications to retrieve and display a "travel fee table" of one of staves appearing on a "list of staves";

FIG. 12(C) shows document data displayed as a result of the designated data shown in FIGS. 12(A) and 12(B)

DETAILED DESCRIPTION OF THE PREFERRED EMBODIMENTS

Now, the present invention will be described with reference to the accompanying drawings.

Figure 1:
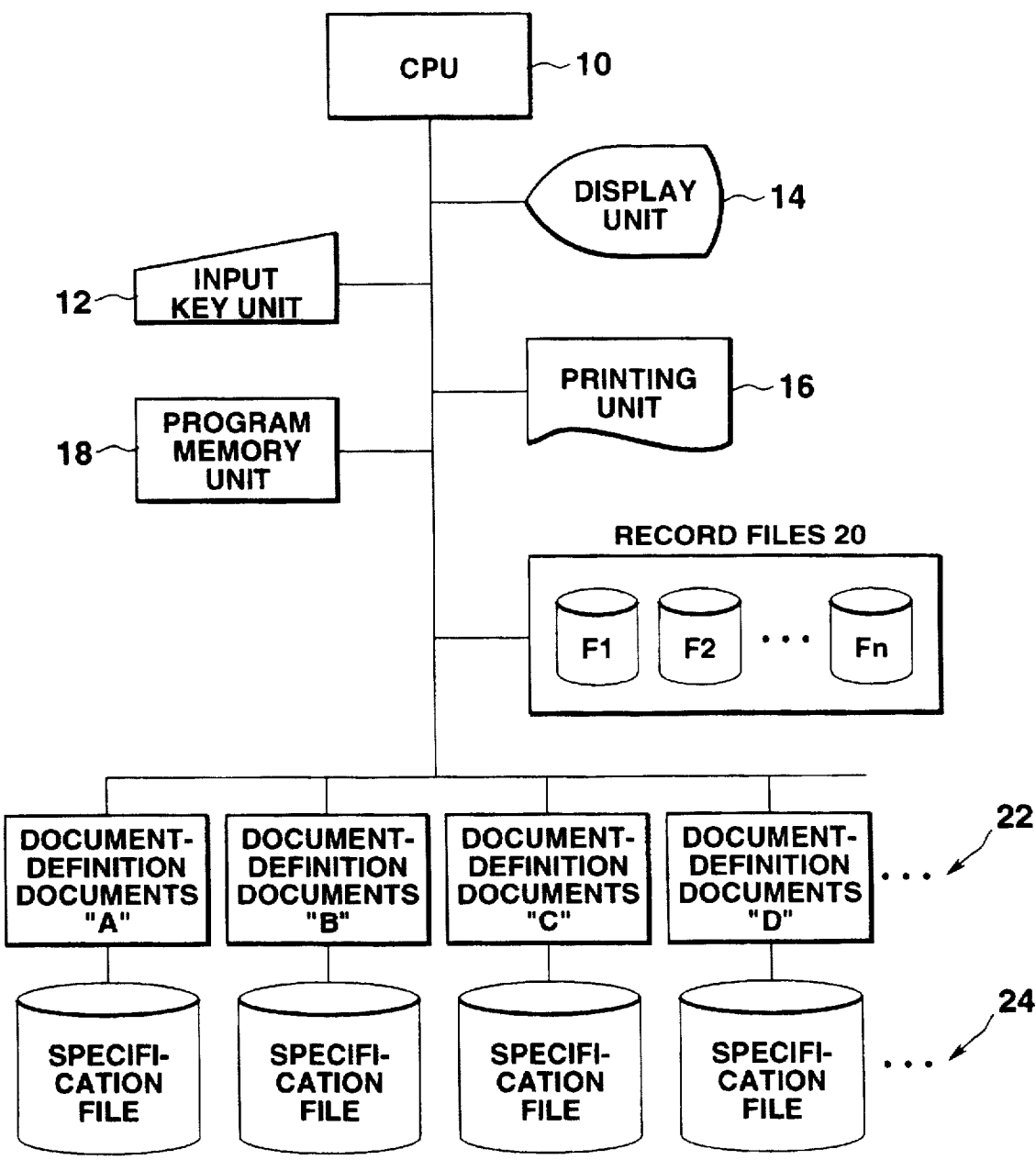
FIG. 1 is a block diagram showing a structure of a first embodiment of the file processing apparatus of the present invention.

FIG. 1 is a view showing a whole structure of a first embodiment of a document processing apparatus according to the present invention. In FIG. 1, a reference numeral 10 denotes a central processing unit (CPU) for controlling operations of the document processing apparatus. A reference numeral 12 denotes an input key unit for inputting various definitions, a reference numeral 14 represents a display unit 14 for displaying a definition screen and a created record, and a reference numeral 16 is a printing unit for printing the created recording books. A numeral 18 is a program memory for storing a program for creating records, and a numeral 20 denotes record files F1, F2, . . . Fn, for example, of sales data base, product data base, and the like. The program memory unit 18 has memory media, on which programs necessary for outputting records are previously memorized. The memory medium comprises a magnetic optical memory medium or a semi-conductor memory. The memory medium is mounted fixedly in or detachably from a storing device. The program to be memorized on the memory medium in the program memory unit 18 may be received from other apparatus through a communication line, or the program to be used may be received through the communication line from a storing device of other apparatus which memorizes same on the memory medium mounted therein.

Figure 2:
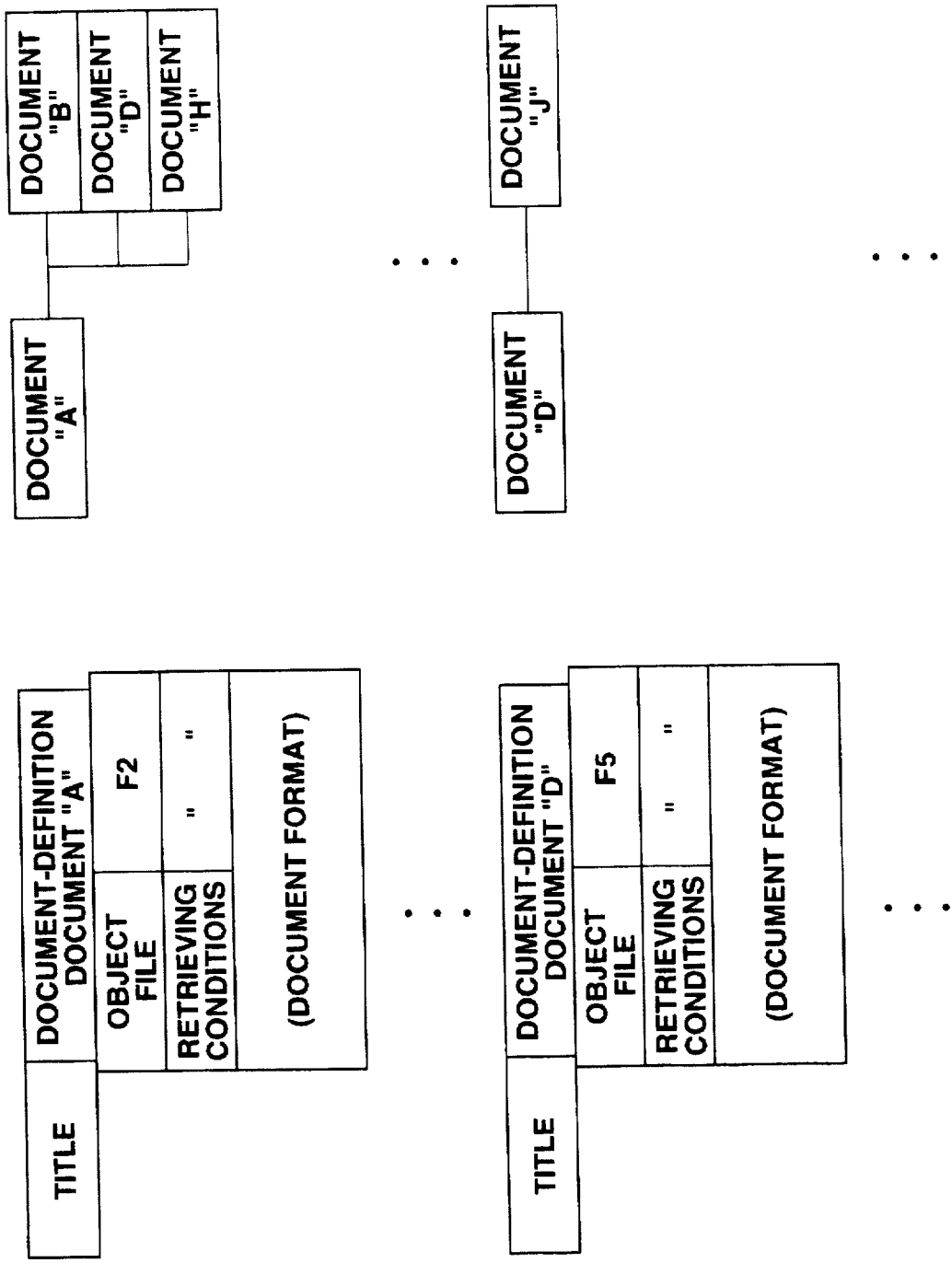
FIG. 2(A) is a view showing contents of a document-definition document.
FIG. 2(B) is a view showing contents of a specification file.

A numeral 22 represents, for example, document-definition documents, "A", "B", "C" and "D", which describe, for example, definitions of documents to be created, such as a "list of results of the persons in charge for an area" and a "record of changes in monthly results of a person in charge". The document-definition document "A" describes a title of a document, and defines an object file, retrieving conditions, and a document format, as shown in FIG. 2(A). The retrieving conditions may be decided appropriately.

A numeral 24 denotes specification files which correspond respectively to the document-definition documents, and each of which memorizes a title of a document described in the corresponding document-definition document 22, as shown in FIG. 2(B). In other words, the specification files each describe document information relating to the corresponding document-definitions.

Now, operation of the document processing apparatus with the above structure will be described referring to a flowchart of FIG. 3. The programs for effecting functions appearing in the flowchart of FIG. 3, are written in program codes which can be read by the CPU 10, and are memorized in the program memory unit 18.

Figure 3:
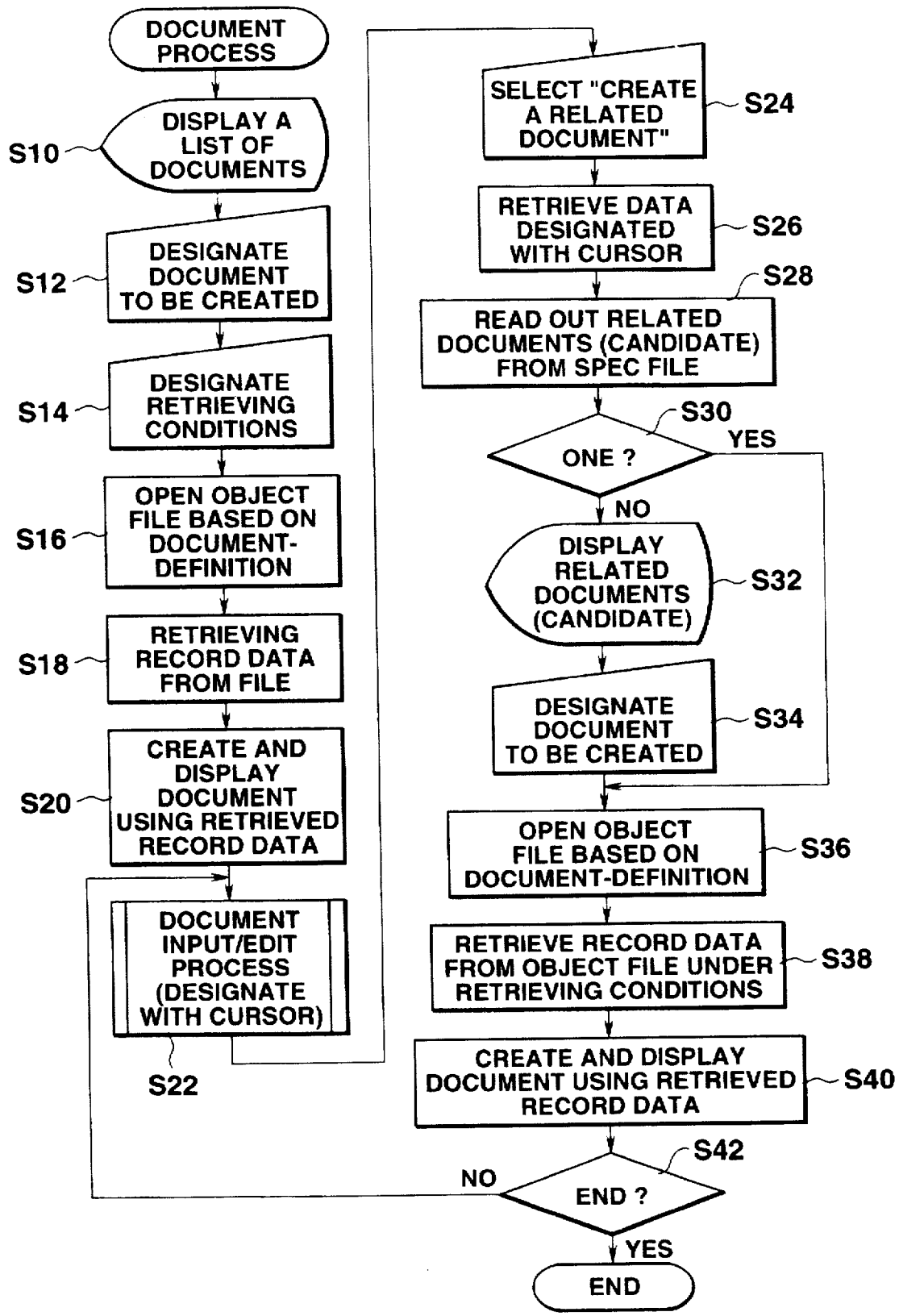
FIG. 3 is a flow chart of operation of the first embodiment.

In accordance with the flowchart of FIG. 3, a document process is executed. A list of documents, which are described in the document-definition documents 22, is displayed on the display unit 14 at step S10. Manipulating the input key unit 12, an operator designates one of documents to be created from among the documents displayed on the display unit 14 at step S12, and further designates retrieving conditions at step S14. For example, the "list of results of the persons in charge for an area" is designated as a document to be created, and "July" is selected for the retrieving condition.

Figure 4:
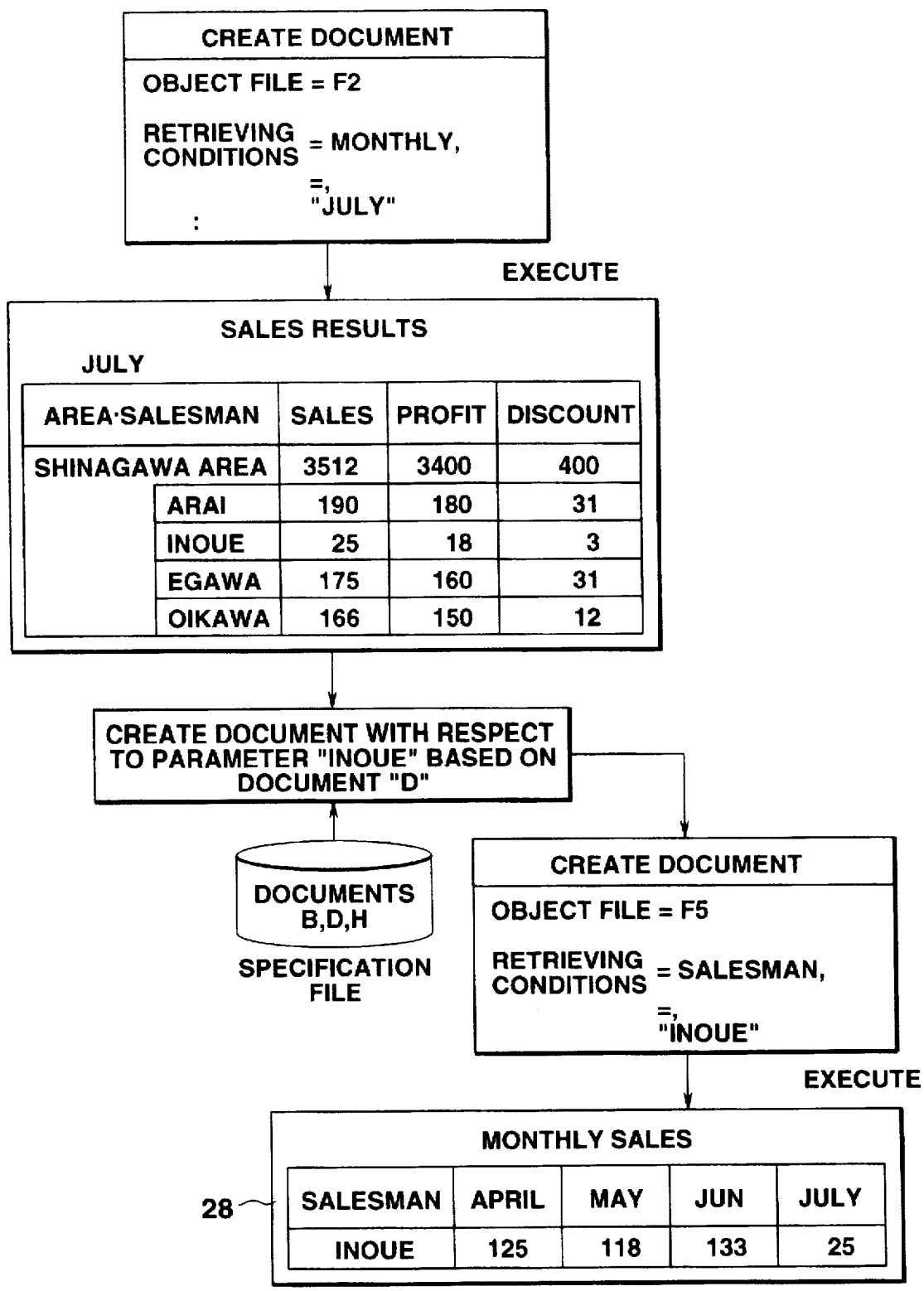
FIG. 4 is a view for explaining the operation executed in accordance with the flow chart of FIG. 3.

Once the document to be created and the retrieving conditions are designated, an object file among the record files (in this case, a record file F2) is open at step S16, and records or results are retrieved from the record file F2 at step S18, in accordance with the document-definition document "A" shown in FIG. 2(A). The document is created using the retrieved records or results, and the created document is displayed on the display unit 14 at step S20, as shown at 26 in FIG. 4.

When, upon reviewing the created document displayed on the display unit 14, the operator finds another document necessary, for example, a "record of changes in sales results of INOUE" (a name of a salesman) (for example, a document "D"), he (she) positions a cursor on "INOUE" by operating the input key unit 12. Then, retrieving conditions (parameters) are determined to create a document that he (she) needs, without designating respective retrieving conditions with the input key unit 12.

Following to the process to create and display the document at step S20, a document input/editing process is executed at step S22. Actually, the operator is required only to perform a positioning operation of the cursor to select data. When an item of "Create a related document" is selected by operating the input key unit 12 at step S24, data on which the cursor positions, i.e., data of "INOUE", is retrieved at step S26.

A document (candidate) is read out from the specification file 22 corresponding to the document-definition document 22 (in this case, the document-definition document "A"). In the case that plural documents (candidates) are read out, i.e., for example, the documents "B", "D" and "H" are read out, at step S30 as in the case of document-definition document "A" (as shown in FIG. 2(B)), these documents (candidates) are displayed on the display unit 14 at step S32 and the operator selects as the document to be created one of the displayed documents (candidates) "B", "D" and "H" by operating the input key unit 12 at step S34. Meanwhile, one document (candidate) is read out, i.e., the document "J" is read out, at step S30 as in the case of the document-definition document "D" (as shown in FIG. 2(B)), and the document "J" is selected as the document to be created.

When a document to be created is selected, i.e., when, for example, a "transitive sales table" corresponding to the document-definition document "D" is selected, an object file (in this case, the record file F5) among the record files 20 is open in accordance with the document-definition document 22 of the selected document (refer to FIG. 2(A)) at step S36. With respect to the retrieving conditions (INOUE) obtained at step S26, record data are retrieved from the object file F5 at step S38, and the a document is created from the retrieved record data and is displayed at step S40 as shown at 28 in FIG. 4.

Thereafter, when, reviewing the created "transitive sales table", the operator finds it necessary to create yet another document with respect to some data indicated in the document (at step S42), then, the processes from step S22 to step S40 will be repeatedly executed.

In the above described arrangement, in which information of related documents corresponding to the respective document definitions are stored, when an instruction is given to create a related document during the process being subjected to the first document, then the second document definition related with the first document is automatically designated. When the second document definition is specified based on the records of the corresponding file, data of the first document designated with the cursor are retrieved to define the retrieving conditions, and the record data are read out with respect to the defined retrieving conditions to create the another document.

When only one document relates to the respective documents, only the related document is designated to instantly create and output the second document related to the first document without selecting any other documents.

In the present embodiment of the present invention, the document processing apparatus has been described which processes or creates documents from record data, but the present invention is not limited to the apparatus for processing record data but is applicable to apparatus for processing document data, table data and the like.

In the present embodiment of the document processing apparatus, the retrieved data is defined and used as the retrieving conditions. But the retrieved data may be used a as a title of the second document (a document to be newly created), and may be used as a key for selecting the second document.

The data to be retrieved is designated with the cursor, but it may be arranged such that data located at predetermined positions on the document are automatically retrieved.

The present invention is not limited to the document processing apparatus for creating documents but to those only for reading out another document to display same. This is the case that the document includes only text data.

Now, a second embodiment of a document processing apparatus according to the present invention will be described with reference to a flow chart of FIG. 5. The second embodiment of the document processing apparatus automatically uses data of the first document as a key for designating the second document to read out and display same. An operation program is stored in the program memory unit 18, for the document processing apparatus to operate in accordance with the flow chart of FIG. 5.

Figure 5:
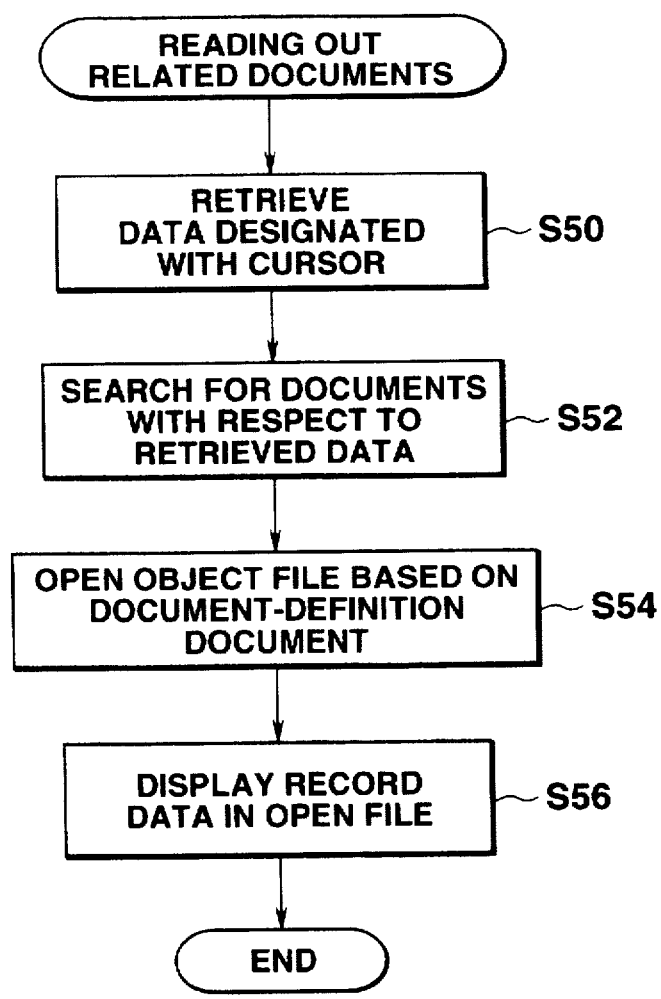
FIG. 5 is a flow chart of operation of a second embodiment of the file processing apparatus of the invention.

When an instruction is entered from the input key unit 12 to read out a related document, data on which the cursor is positioned is retrieved at step S50 of FIG. 5. Documents are searched for with respect to the retrieved data (a key) at step S52. An object file among the record files 20 is open based on the document-definition document 22 of the searched document at step S54. Record data written in the open file are displayed on said display unit 14 as a document in a document format defined in the document-definition document 22 at step S56.

Now, a third embodiment of the present invention will be described with reference to FIGS. 6–12.

Figure 6:
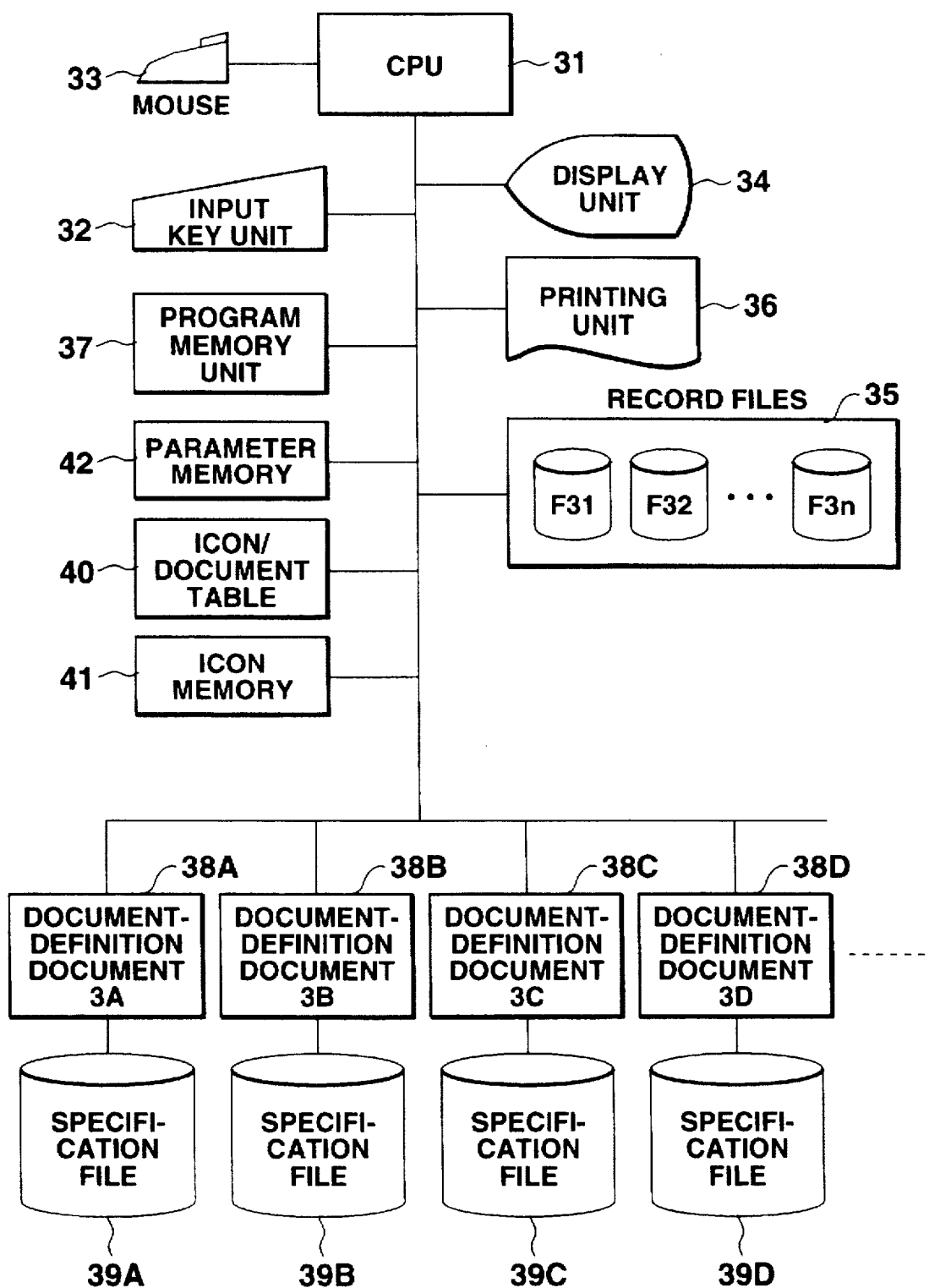
FIG. 6 is a block diagram of a third embodiment of the file processing apparatus of the present invention.

FIG. 6 is a view showing a whole structure of a file processing apparatus according to the present invention. In FIG. 6, a central processing unit (CPU) 31 controls a whole operation of the file processing apparatus in accordance with various programs. The CPU 31 receives document data inputted through the input key unit 32 to effect a file processing. When an arbitrary position on a display unit 34 is designated by operation of a pointing device or a mouse 33, the CPU 31 takes in and processes the coordinate data of the position designated on the display unit 34 with the mouse 33. Further, receiving an instruction of printing a document, the CPU 31 retrieves record data from an object file among record files 35, creates document data based on the retrieved record data, and supplies a printing unit 36 with the document data.

Figure 8:
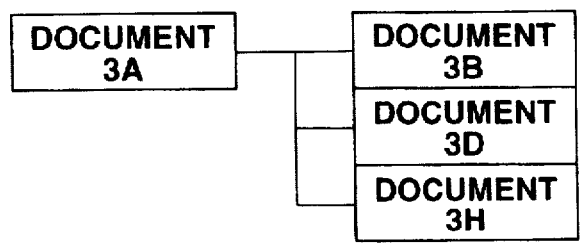
FIG. 8 is a view showing contents of a specification file 39A.

A program memory unit 37 stores a program for performing a document process to retrieve file data to display or output same. The CPU 31 works in accordance with the program stored in the program memory unit 37. As shown in FIG. 6, the file processing apparatus is provided with record files 35 including record files F31, F32, . . . F3n, and further provided with document-definition documents 38A, 38B, 38C, 38D and so on, and specification files 39A, 39B, 39C, 39D and so on, which document-definition files and specification files correspond respectively to the record files F31, F32, . . . F3n. As shown in FIGS. 7A and 7B, each of the document-definition files 38A, 38B, 38C, 38D and so on specifies a document and object files corresponding thereto, and further defines retrieving conditions under which record data are retrieved from the object files and a document format of a document to be created. The specification files 39A, 39B, 39C, 39D and so on store link information for linking related documents together. FIG. 8 is a conceptional view showing that a document 3A is related with documents 3B, 3D and 3H in business operation.

In this case, with file data corresponding to the document 3A displayed, the program stored in the program memory unit 37 includes a process of referring to the specification file 38A corresponding to the document 3A to display icons for representing the documents 3B, 3D and 3H related with the document 3A. FIG. 9 is a view showing an example of the present case. More specifically, with a staff document of "a list of staff members in respective departments" displayed, icons representing documents related with the staff document are displayed in an icon window to show documents related to the staff document. An icon/document table 40 stores relations between the icons and the documents. For example, FIG. 10 is a view showing an icon/document table 40 for an icon window corresponding to the document 3A. In the icon/document table 40 are stored coordinates (x-distance, y-distance) of the icons in the icon window, icon titles and related document titles. An icon memory 11 stores images of icons and icon titles thereof. The program memory unit 37 stores a program including a process for reading out an icon image from the icon memory 41 and for displaying the read out icon image at the position specified in the icon/document table 40. In the present embodiment, up to five icon images of the related documents can be displayed in the icon window.

A parameter memory 42 is a storage for temporarily storing data that are selected from a document displayed on the display unit 34 as parameters of the record retrieving conditions. With data displayed on the display unit 34, the cursor is moved to position on the data with the mouse 33, and the mouse button is pressed and held down and the mouse 33 is moved to another location and released. Then, the data pointed with the cursor is moved with the cursor to the another location, and is displayed at the another location (a drag and drop operation). When the operator drags and drops designated data on an icon in the icon window, then record data concerning the designated data, i.e., the record retrieving conditions, are retrieved from a file corresponding to the icon under the designated data retrieving conditions. From the retrieved record data, document data are produced and displayed on the display unit 34.

Figure 11:
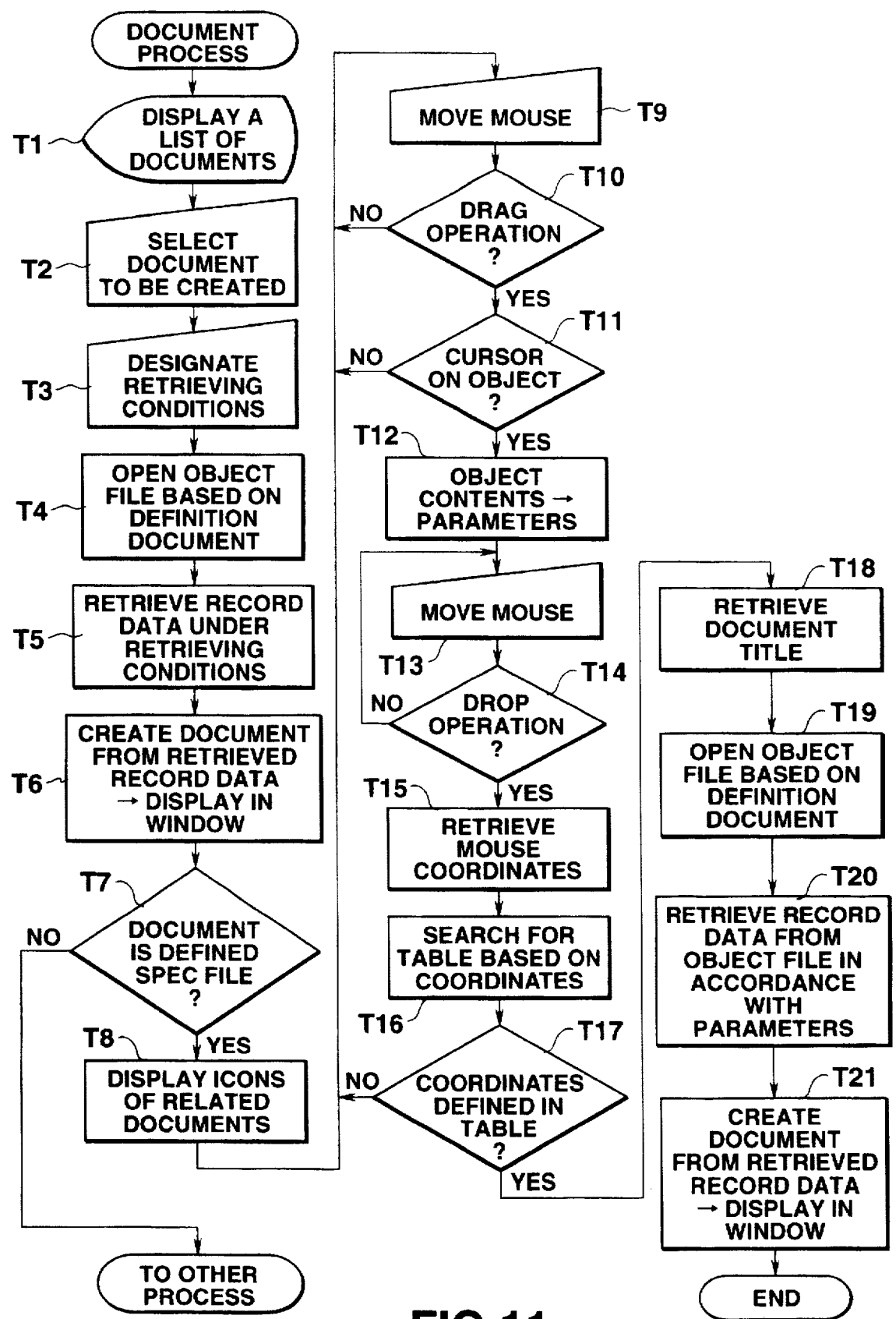
FIG. 11 is a flow char of a program stored in a program memory 37.
Figures 13A, 13B:
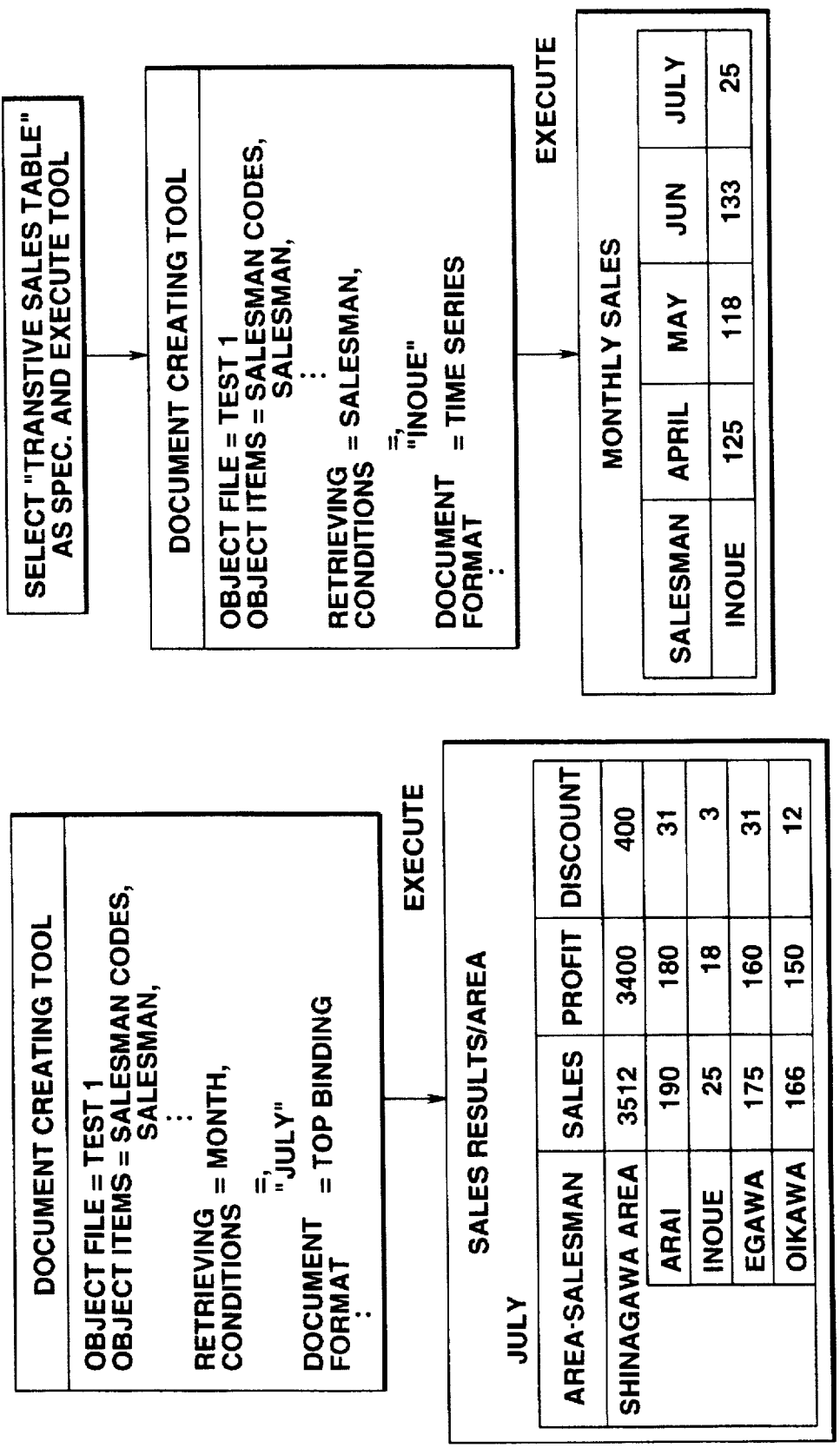
FIG. 13(A) is a view showing a document creating process in a conventional apparatus.
FIG. 13(B) is a view showing an operation to create a document from a previously created document in the conventional apparatus.

Operation of the third embodiment of the invention will be described with reference to a flow chart of FIG. 11. The flow chart of FIG. 11 indicates operations performed in accordance with the program stored in the program memory unit 37. An initial indication, i.e., a list of document titles, is displayed on the display unit 34 at step T1 of FIG. 11. When the operator designates a document title among the list of document titles by operating the mouse 33 and the input key 32 at step T2, and specifies retrieving conditions at step T3, a document-definition corresponding to the designated document (document to be created) is selected from among the document-definition documents 38A, 38B, . . . , and object files in the record files 35 are opened in accordance with the contents of the selected document-definition document at step T4. Further, record data are retrieved from the open object files in accordance with the retrieving conditions at step T5. Then, document data are produced and displayed on the display unit 34 based on the retrieved record data and the document format specified in the selected document-definition document at step T6.

At step T7, the specification file corresponding to the designated document is accessed and it is judged whether documents linked to the designated document are defined in the specification file. Assuming that the document 3A has been designated, the icon/document table 40 is referred to based on the contents of the specification file 39A and icons representing the documents 3B, 3D and 3H are read out from the icon memory 41 and displayed in the icon window at step T8, because the document titles 3B, 3D and 3H that are linked to the designated document 3A are stored in the specification file 39A. In other words, the related document titles 3B, 3D and 3H are read out from the specification file 39A, and the icon/document table 40 of FIG. 10 is accessed to read out icon titles corresponding to the document titles 3B, 3D and 3H therefrom. Further, the icon memory 41 is accessed based on the read out icon titles to read out corresponding icon images therefrom. The read out icon images are displayed respectively at locations specified in the icon/document table 40, as shown in FIG. 9. In FIG. 9, staff members belonging to various departments are indicated in a designated coordinate A (an indication area A), and an indication area therebelow is provided as the icon window, in which icons of the related documents are displayed.

When, with the above indications displayed on the display unit 34, the operator moves the mouse 33 at step T9, it is judged at step T10 whether the drag and drop operation is executed. When the operator points to a predetermined location in a name section with the mouse 33 to designate data within the designated document, and moves the mouse 33 with the mouse button pressed and held down as shown in FIG. 12A, it is determined at step T10 that the drag and drop operation is executed, and the operation goes to step T11, where it is judged whether a location of a predetermined object is pointed to or designated. If a location other than the predetermined object is pointed to, then the operation returns to step T9, ignoring the pointing operation. When the location of the predetermined object is pointed to, data corresponding to the pointed location (the location of the predetermined object) is read out as a parameter of the record retrieving conditions, and the parameter is set to the parameter memory 42 at step T12.

The parameter of the location of the object is moved along with the mouse dragging operation until the dropping operation is executed (steps T13 and T14). When the dropping operation is executed, coordinates of the present location of the mouse are detected at step T15, and the icon/document table 40 is searched for based on the detected coordinates at step T16 to determine at step T17 whether the coordinates are defined therein. In other words, it is determined whether the parameter is moved to the location of an icon in the icon window. As shown in FIG. 12B, the parameter "name" is moved onto an icon, and when the dropping operation is executed with the parameter positioned on the icon, the operation goes to step T18, where the title of a related document corresponding to the icon is read out from the icon/document table 40. The document-definition document corresponding to the read out title of the related document is accessed, and the object file is opened based on the contents of the document-definition document at step T19. Then, record data is retrieved from the object file under the retrieving conditions or the designated data in the parameter memory 42 at step T20. The document data are created based on the retrieved record data and the document format in the document-definition document, and are displayed in the window on the display unit 34 at step T21, as shown in FIG. 12C.

More specifically, when it is necessary to confirm a travel fee used by a certain staff member appearing in a document of "a List of Staff Members in respective Departments", the operator operates the mouse to displays in the window a related document of "Travel Fee of Staff Members" shown in FIGS. 12A and 12B, and necessary information can be reviewed on the document displayed on the display unit 34. In the above example, a name column is designated, but any of the locations of predetermined objects may be designated to make the apparatus work in a similar manner.

In the above embodiment of the invention, icons of related documents necessary for executing some business are displayed within the icon window on the displayed document. Therefore, it is easy to confirm what documents relate to the designated document.

To retrieve the related documents, any data on the displayed document may be directly designated as retrieving conditions, and, further, data may be selected and moved to any location on the displayed document by the drag and drop operation, which will provide easy data processing and effectively reduce even in inputting operations in office work.

The file processing apparatus of the invention may be arranged such that, to prevent from designating data other than the data which are really necessary as the retrieving conditions, the data other than the really necessary data are displayed inactive or in shadow. If the related documents constitute an hierarchical structure, the icons of these documents may be displayed in the window in an hierarchical manner. In the described file processing apparatus, a mouse is used as a pointing device, but other devices such as a touch pen and a touch screen may be used in place of such pointing device.

What is claimed is:

1. A file processing apparatus having a display screen with a cursor displayed thereon, and for retrieving record data of a desired record from plural files, said file processing apparatus comprising:

first display control means for displaying on the display screen plural record data stored in a first file among the plural files;

data designating means for designating, with the cursor, a display position of desired data among each of the plural record data displayed on the display screen;

file selecting means for selecting a second file different from the first file from among the plural files;

data retrieving means, responsive to said file selecting means selecting the second file, for retrieving from the second file selected by said file selecting means, record data including the desired data designated by said data designating means, using the desired data as a keyword; and second display control means for displaying on the display screen the record data retrieved from the selected second file by said data retrieving means.

2. A file processing apparatus according to claim 1, further comprising:

file-designating data storing means for storing file designating data for designating a file which is related to the first file and which includes record data to be retrieved by said data retrieving means; and file displaying means for, with the record data of the first file displayed on said display screen, displaying on the display screen a file designated by the file designating data stored in said file-designating data storing means.

3. A file processing apparatus according to claim 2, wherein:

the file designating data stored in said file-designating data storing means designates plural files which are related to the first file and which include record data to be retrieved by said data retrieving means;

said file displaying means displays on the display screen plural files designated by the file designating data stored in said file-designating data storing means; and said file selecting means selects a desired second file from among the plural files displayed on the display screen by said file displaying means.

4. In a file processing apparatus having a display screen with a cursor displayed thereon, and for retrieving record data of a desired record from plural files stored therein, a data displaying method comprising the steps of:

displaying on the display screen plural record data stored in a first file among the plural files;

designating, with the cursor, a display position of desired data among each of the plural record data displayed on the display screen;

selecting from among the stored plural files and displaying on the display screen one or plural files which are related to the first file and which include record data to be retrieved;

selecting a second file from among the plural files displayed, and retrieving record data including the designated data from the selected second file; and displaying the retrieved record data on the display screen.

5. A memory medium used with a computer which is provided with a display screen and which computer has a plurality of files stored therein, said memory medium having a computer program stored therein for causing the computer to execute functions as follows:

a function of displaying on the display screen plural record data stored in a first file among the plurality of files stored in the computer;

a function of designating, with a cursor on the display screen, a desired data among each of the plural record data of the first file displayed on the display screen;

a function of selecting from among the plurality of files stored in the computer one or plural files related to the first file which is displayed on the display screen, and displaying the selected one or plural files which are related to the displayed first file;

a function of designating a second file from among the selected and displayed plural files;

a function of retrieving from the designated second file record data including the designated desired data among each of the plural record data of the first file; and a function of displaying the retrieved record data on the display screen.

6. A file processing apparatus having a display screen with a pointing device displayed thereon, and for retrieving file data from files to display the retrieved file data on said display screen, said apparatus comprising; link-data storing means for storing link data which links related file data together;

first display control means for, when file data is selected from among plural file data, displaying the selected file data on said display screen, and for displaying on said display screen icons of files which include file data that are linked to the displayed selected file by the link data stored in said link-data storing means;

a memory for, when data among the file data displayed on said display screen by said first display control means is designated with the pointing device, temporarily storing the designated data; and second display control means for, when one of the icons displayed on said display screen by said first display control means is designated with the pointing device, retrieving data relating to the designated data stored in said memory from the file represented by the designated icon, and for displaying the retrieved data on said display screen.

7. A file processing apparatus according to claim 6, further comprising:

means for enabling data designated with the pointing device to move along with the pointing device;

and wherein:

when data is moved and positioned with the pointing device on a desired icon displayed on said display screen, said second display control means retrieves data relating to the data designated and moved with said pointing device from the file represented by the desired icon, and displays the retrieved data on said display screen.

\* \* \* \* \*